(12) United States Patent
Jang et al.

(10) Patent No.: US 9,591,520 B2
(45) Date of Patent: Mar. 7, 2017

(54) METHOD AND APPARATUS FOR REDUCING INTERFERENCE BETWEEN TWO DIFFERENT COMMUNICATION MODULES

(71) Applicant: Samsung Electronics Co., Ltd., Suwon-si, Gyeonggi-do (KR)

(72) Inventors: Jae Hyuk Jang, Suwon-si (KR); Kyeong In Jeong, Suwon-si (KR); Soeng Hun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 14/364,793

(22) PCT Filed: Jan. 28, 2013

(86) PCT No.: PCT/KR2013/000656
§ 371 (c)(1),
(2) Date: Jun. 12, 2014

(87) PCT Pub. No.: WO2013/112014
PCT Pub. Date: Aug. 1, 2013

(65) Prior Publication Data
US 2014/0341059 A1 Nov. 20, 2014

Related U.S. Application Data

(60) Provisional application No. 61/591,385, filed on Jan. 27, 2012.

(51) Int. Cl.
*H04W 28/04* (2009.01)
*H04W 48/06* (2009.01)
(Continued)

(52) U.S. Cl.
CPC ........ *H04W 28/048* (2013.01); *H04W 24/02* (2013.01); *H04W 48/06* (2013.01);
(Continued)

(58) Field of Classification Search
CPC ... H04W 72/08; H04W 28/048; H04W 48/20; H04W 74/0833; H04W 24/10; H04W 76/046; H04W 12/02; H04W 24/02
(Continued)

(56) References Cited

U.S. PATENT DOCUMENTS

2006/0133334 A1* 6/2006 Ross ................. H04W 72/1215
370/338
2010/0128689 A1* 5/2010 Yoon .................... H04B 17/318
370/329
(Continued)

FOREIGN PATENT DOCUMENTS

WO 2012/010104 A1 1/2012
WO WO 2012/010104 * 1/2012

OTHER PUBLICATIONS

3rd Generation Partnership Project; Technical Specification Group Radio Access Network; Evolved Universal Terrestrial Radio Access (E-UTRA); Study on Signalling and Procedure for Interference Avoidance for In-device Coexistence (Release 11); 3GPP TR 36.816 V11.2.0, Jan. 3, 2012.
(Continued)

*Primary Examiner* — Ian N Moore
*Assistant Examiner* — Mewale Ambaye
(74) *Attorney, Agent, or Firm* — Jefferson IP Law, LLP

(57) ABSTRACT

A method for avoiding interference in an idle mode and a method for receiving a public warning system message regardless of an operation mode when different wireless communication modules coexist in a terminal in a wireless communication system are provided. The method for con-
(Continued)

trolling an idle mode of a terminal in a wireless communication system includes determining whether interference occurs between heterogeneous communication modules of the terminal; and limiting, if the interference occurs between the heterogeneous communication modules, camping on a corresponding frequency of the communication module in which the interference occurs. The terminal can maximally avoid the interference in the idle mode to operate without malfunction, and correctly receive the public warning system message regardless of the operation mode to enable the user to timely receive the corresponding message.

10 Claims, 9 Drawing Sheets

(51) Int. Cl.
| | |
|---|---|
| *H04W 24/02* | (2009.01) |
| *H04W 48/18* | (2009.01) |
| *H04W 48/20* | (2009.01) |
| *H04W 68/02* | (2009.01) |
| *H04W 88/06* | (2009.01) |

(52) U.S. Cl.
CPC ............ *H04W 48/18* (2013.01); *H04W 48/20* (2013.01); *H04W 68/02* (2013.01); *H04W 88/06* (2013.01)

(58) Field of Classification Search
USPC .......................................................... 370/252
See application file for complete search history.

(56) References Cited

U.S. PATENT DOCUMENTS

| | | | |
|---|---|---|---|
| 2011/0059768 A1* | 3/2011 | Pandruvada | H04W 88/06 455/552.1 |
| 2012/0020229 A1 | 1/2012 | Dayal et al. | |
| 2012/0020231 A1* | 1/2012 | Chen | H04W 36/08 370/252 |
| 2012/0164948 A1* | 6/2012 | Narasimha | H04W 72/1215 455/63.1 |
| 2012/0213116 A1* | 8/2012 | Koo | H04B 1/1027 370/253 |
| 2013/0208641 A1* | 8/2013 | Baghel | H04B 1/109 370/311 |
| 2013/0223267 A1* | 8/2013 | Jung | H04J 11/005 370/252 |

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 10); 3GPP TS 36.331 V10.2.0, Jun. 24, 2011.

* cited by examiner

METHOD AND APPARATUS FOR REDUCING INTERFERENCE BETWEEN TWO DIFFERENT COMMUNICATION MODULES

TECHNICAL FIELD

The present disclosure relates to a wireless communication system, and more particularly to a method for avoiding interference in an idle mode and a method for receiving a public warning system message regardless of an operation mode when different wireless communication modules coexist in a terminal in a Long Term Evolution (LTE) system.

BACKGROUND ART

Recently, wireless communication technology has been abruptly developed, and thus evolution of communication system technology has been repeated. A system that is currently spotlighted as the fourth generation mobile communication technology is an LTE system.

Further, with the spread of a smart phone, the demand and use of a wireless LAN, Bluetooth, and GPS built in the smart phone have been rapidly increased. With this trend, several communication technologies (e.g., existing cellular network technology (LTE/UMTS), Wireless LAN and Bluetooth, and GNSS/GPS) may coexist in one terminal, and if such heterogeneous communication technologies are simultaneously used, interference problem between them may occur. This issue has been discussed in the name of In-Device Coexistence (hereinafter referred to as 'IDC") by Standardization Organization called 3GPP.

On the other hand, LTE/UMTS communication technology operates in various frequency bands, whereas the communication technology, such as Bluetooth or wireless LAN, operates in Industrial, Scientific and Medical (ISM) band (about 4400 to 2483.5 MHz). Particularly, Band 4 (about 4300 to 2400 MHz) and uplink portion (about 4500 to 2570 MHz) of Band 7 among several bands, in which the LTE/UMTS communication technology is used, are adjacent to the ISM band in which Bluetooth and wireless LAN are used, and if communications are simultaneously performed, a transmission signal in one communication technology may be caught as a reception signal in the other communication technology to cause severe interference between them.

If a terminal is unable to properly receive a message that comes from a base station due to the interference as described above, it may cause malfunction and great inconvenience to a user, and thus there is a need for schemes to solve the above-described problem.

DISCLOSURE OF INVENTION

Technical Problem

The present disclosure has been made in an effort to solve the above-described problem and it is an object of the present disclosure to provide schemes to avoid interference in an idle mode of a terminal when heterogeneous communication modules (e.g., cellular network technologies, wireless LAN, Bluetooth, GPS, and GNNS) coexist in the terminal and schemes to receive a public warning system message regardless of an operation mode in a wireless communication system.

Solution to Problem

In accordance with an aspect of the present disclosure, a method for controlling an idle mode of a terminal in a wireless communication system includes determining whether interference occurs between heterogeneous communication modules of the terminal; and limiting, if the interference occurs between the heterogeneous communication modules, camping on a corresponding frequency of the communication module in which the interference occurs.

In accordance with another aspect of the present disclosure, a terminal includes a control unit configured to determine whether interference occurs between heterogeneous communication modules of the terminal and to limit, if the interference occurs between the heterogeneous communication modules, camping on a corresponding frequency of the communication module in which the interference occurs.

Advantageous Effects of Invention

Using the proposed method, the terminal can maximally avoid the interference in the idle mode to operate without malfunction, and correctly receive the public warning system message regardless of the operation mode to enable the user to timely receive the corresponding message.

The effects that can be obtained in the present disclosure are not limited to the above-described effects, and other unmentioned effects could be clearly understood by those having ordinary skill in the art to which the present disclosure pertains from the following description.

MODE FOR THE INVENTION

Hereinafter, preferred embodiments of the present disclosure will be described in detail with reference to the accompanying drawings. In describing the present disclosure, well-known element structures and technologies are not described in detail since they would obscure the disclosure in unnecessary detail. Further, all terms used in the description are terms that are defined in consideration of their functions in the present disclosure, and may differ depending on intentions of a user or an operator or customs. Accordingly, they should be defined on the basis of the contents of the whole description of the present disclosure.

Figure 1:
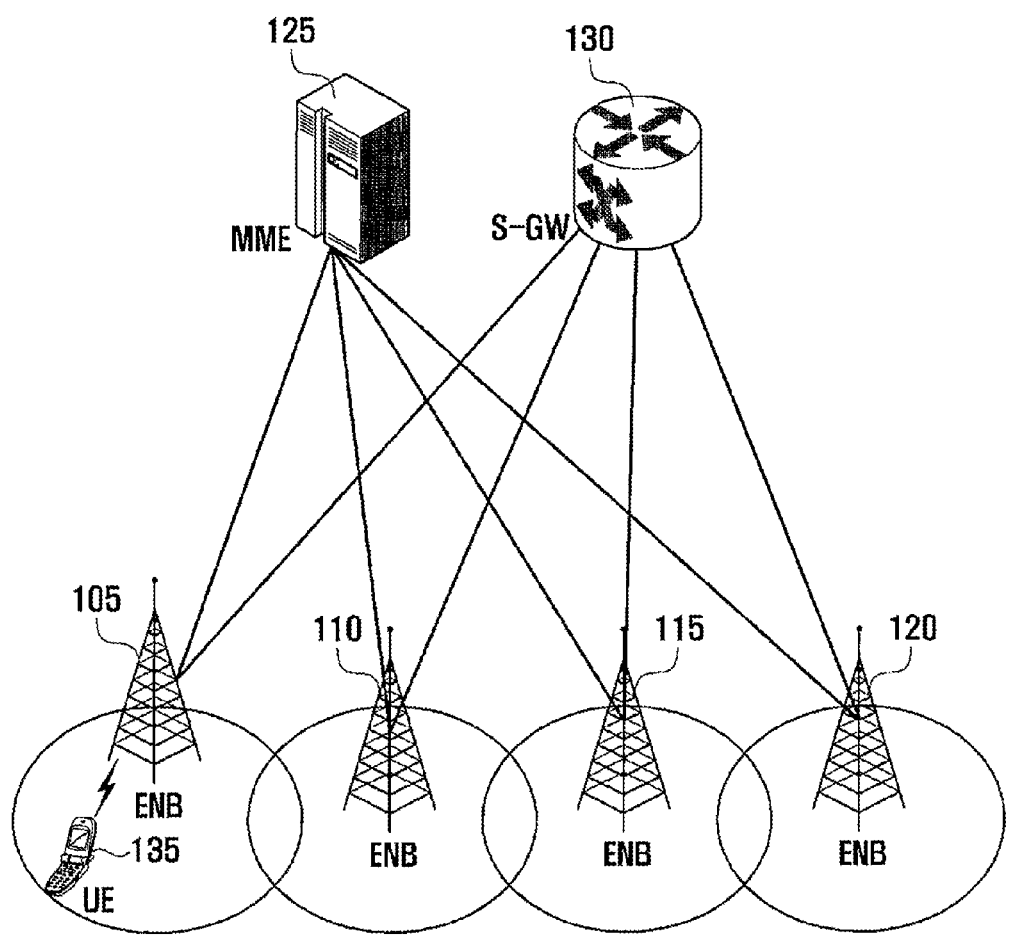
FIG. 1 is a view illustrating the structure of an LTE system to which the present disclosure is applied.

FIG. 1 is a view illustrating the structure of an LTE system to which the present disclosure is applied.

Referring to FIG. 1, a wireless access network of an LTE system includes evolved nodes B (hereinafter referred to as "ENB", "nodes B", or "base stations") 105, 110, 15, and 120, a Mobility Management Entity (MME) 125, and a Serving-Gateway (S-GW) 130. User equipment (hereinafter referred to as "UE" or "terminal") 135 is connected to an external network through the ENBs 105 to 120 and the S-GW 130.

In FIG. 1, ENBs 105 to 120 correspond to existing nodes B of a UMTS system. The ENB is connected to the terminal 135 through a wireless channel and plays a complicated role as compared with the existing node B. Since all user traffics including real-time services, such as Voice over Internet Protocol (VoIP) through the Internet protocol are served through a shared channel in an LTE system, devices that collect and schedule state information of terminals, such as buffer state, available transmission power state, and channel state, are required, and the ENBs 105 to 120 serve as such devices. One ENB typically controls a plurality of cells. For example, in order to implement a transmission rate of 100 Mbps, the LTE system uses, for example, Orthogonal Frequency Division Multiplexing (hereinafter referred to as "OFDM") in the bandwidth of 20 MHz as wireless connection technology. Further, the LTE system adopts Adaptive Modulation & Coding (hereinafter referred to as "AMC") method that determines modulation schemes and channel coding rate to match the channel state of the terminal. The S-GW 130 is a device that provides data bearer, and generates or removes the data bearer under the control of the MME 125. The MME is a device that takes charge of various control function in addition to mobility management function for the terminal, and is connected to a plurality of base stations.

Figure 2:
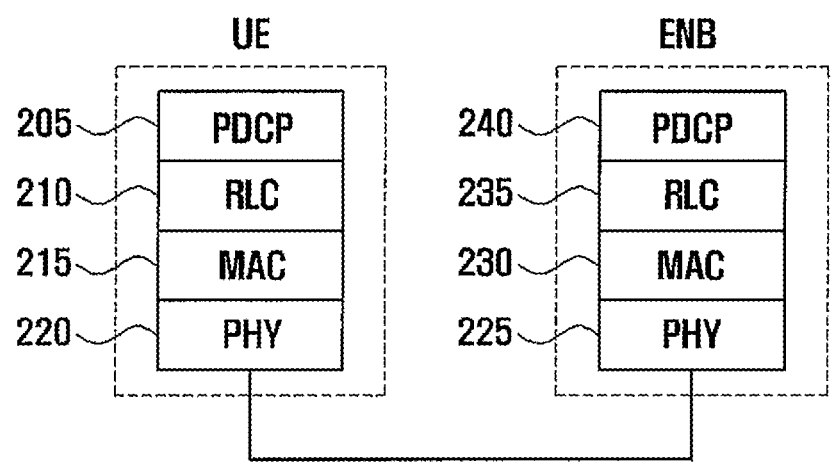
FIG. 2 is a diagram illustrating a wireless protocol structure in an LTE system to which the present disclosure is applied.

FIG. 2 is a diagram illustrating a wireless protocol structure in an LTE system to which the present disclosure is applied.

Referring to FIG. 2, a wireless protocol of an LTE system includes Packet Data Convergence Protocols (PDCPs) 205 and 240, Radio Link Controls (RLCs) 210 and 235, and Medium Access Controls (MAC) 215 and 230. The PDCPs 205 and 240 take charge of IP header compression/decompression operations and reconfigure Radio Link Controls (hereinafter referred to as "RLCs") 210 and 235 with an appropriate size. MACs 215 and 230 are connected to various RLC layer devices provided in one terminal, and performs multiplexing of RLC PDUs to MAC PDU and demultiplexing of RLC PDUs from MAC PDU. Physical layers 220 and 225 perform channel coding and modulation of upper layer data to OFDM symbols to transmit the OFDM symbols to a wireless channel, or perform demodulation and channel decoding of the OFDM symbols received through the wireless channel to transmit the OFDM symbols to an upper layer. Further, for additional error correction, the physical layer uses Hybrid ARQ (HARQ), and a receiving end transmits whether a packet that is transmitted from a transmitting end is received with one bit. This is called HARQ ACK/NACK information. Downlink HARQ ACK/NACK information for uplink transmission may be transmitted through Physical Hybrid-ARQ Indicator Channel (PHICH) physical channel. Further, uplink HARQ ACK/NACK information for downlink transmission may be transmitted through Physical Uplink Control Channel (PUCCH) or Physical Uplink Shared Channel (PUSCH) physical channel.

The physical layer of the LTE system has a structure of a radio frame having a length of 10 ms for uplink and downlink data transmission, and provides two kinds of wireless frames. Type 1 is applied to Frequency Division Duplex (FDD), and Type 2 is applied to Time Division Duplex (TDD).

The two types commonly have a length of 10 ms, and each type is composed of 10 sub-frames having a length of 1 ms. That is, one wireless frame is composed of 10 sub-frames in total, i.e., sub-frame 0 to sub-frame 9.

In the case of FDD, the uplink and the downlink are separated using different frequency regions, and each of the uplink and the downlink is composed of 10 sub-frames. In the case of TDD, sub-frames in one wireless frame are divided into a downlink sub-frame, an uplink sub-frame, and a special sub-frame according to the setting state, and the special sub-frame is further divided into a Downlink Pilot Time Slot (DwPTS), a Guard Period (GP), and an Uplink Pilot Time Slot (UpPTS), and serves as a switching point of the downlink and the up link. The lengths of DwPTS, GP, and UpPTS can be differently set, but the sum of the lengths of DwPTS, GP, and UpPTS is 1 ms in the same manner as other sub-frames.

Figure 3:
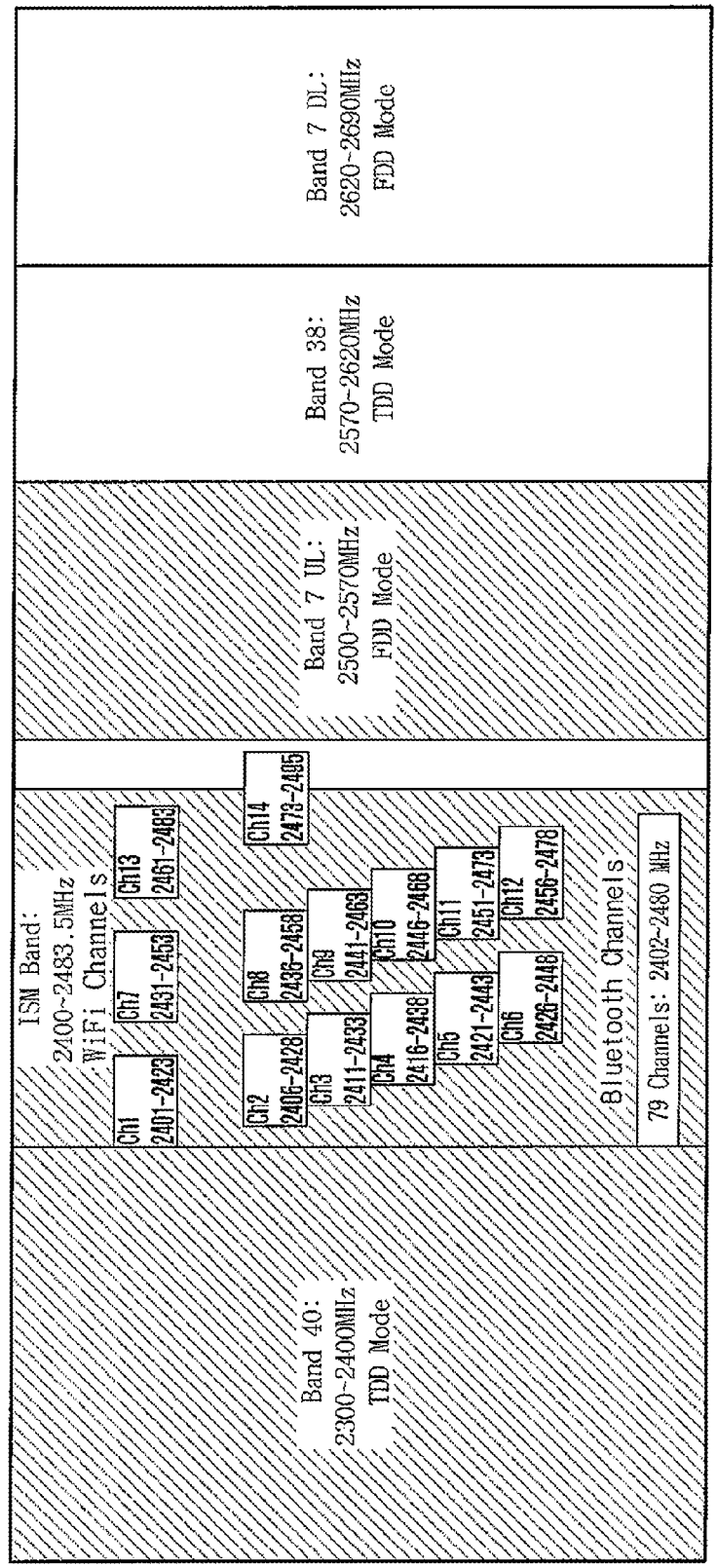
FIG. 3 is a diagram illustrating a frequency band that is adjacent to an ISM band among frequencies that are currently used for mobile communication in 3GPP.
Figure 4:
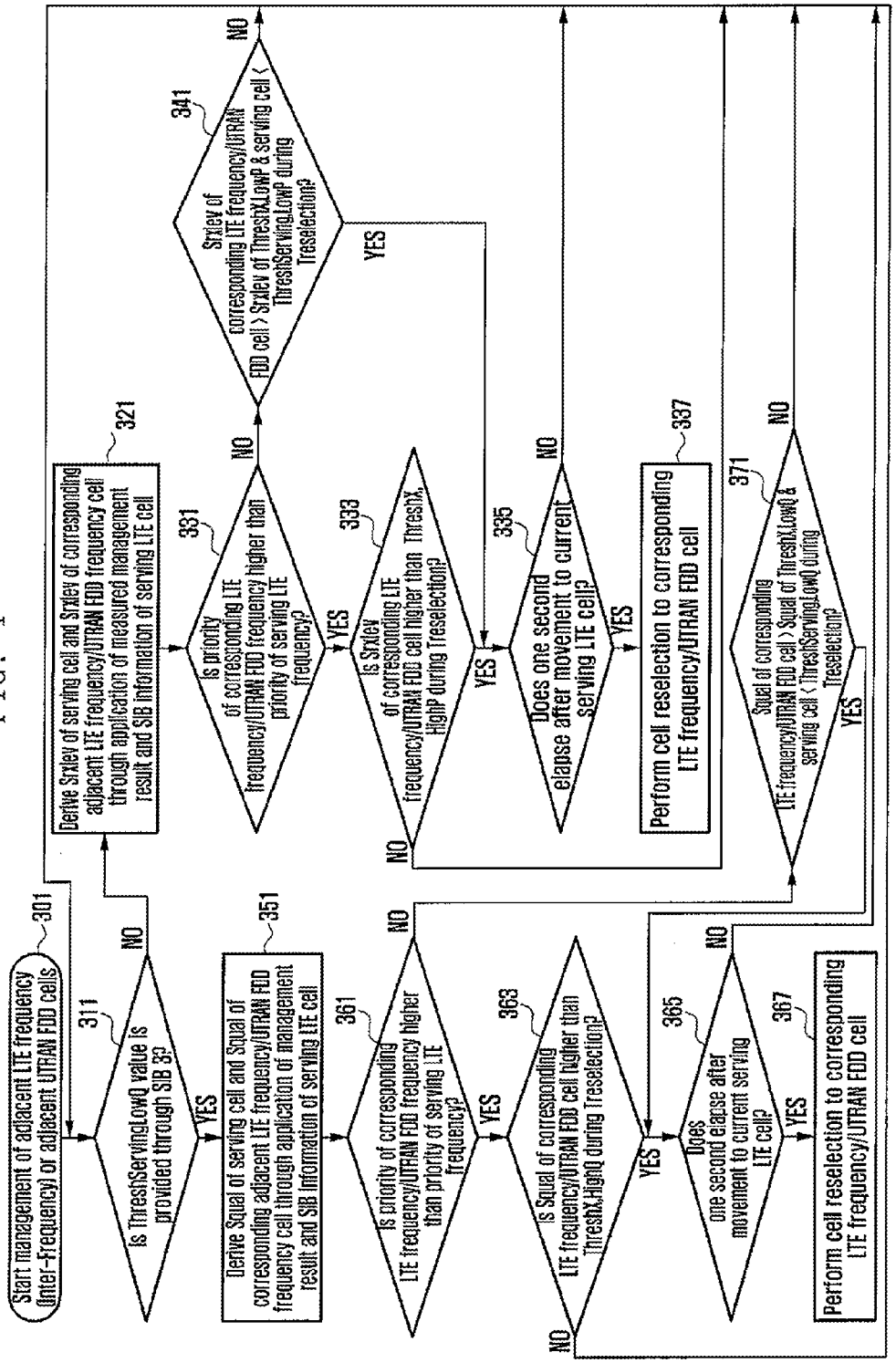
FIG. 4 is a diagram illustrating a cell selection (reselection) method to LTE adjacent frequency/adjacent UTRAN FDD frequency of a terminal in a 3GPP system.

FIG. 3 is a diagram illustrating a frequency band that is adjacent to an ISM band among frequencies that are currently used for mobile communication in 3GPP. In FIG. 3, in the case where a mobile communication cell uses Band 40 and the wireless LAN uses channel number 1, the interference phenomenon becomes severe, and in the case where the mobile communication cell uses Band 7 and the wireless LAN uses channel number 13 or 14, the interference phenomenon becomes severe. Accordingly, there is a need for schemes to properly avoid the interference when the interference occurs.

On the other hand, the terminal may operate in a connected mode and in an idle mode depending on the connection state with the base station.

Further, the base station can be classified as follows according to the provided service.

Acceptable cell
    Cell in which a terminal can provide limited services (emergency call and misfortune service)
    Cell that is not barred and satisfies a cell selection condition Suitable cell
    Cell in which a terminal can provide a normal service
    Cell that is a part of selected enterpriser/registered enterpriser/equivalent enterpriser
    Closed Subscriber Group (CSG) cell that exists in CSG ID and CSG white list that the CSG cell broadcasts
    Cell that is not barred and satisfies a cell selection condition Barred cell
    Cell that is barred through system information Reserved cell
    Cell that is reserved through system information The state of a terminal in an idle mode is further divided into the following states depending on which cell the terminal is searching or which cell the terminal is camped on Camped normally state
    A terminal is in "camped normally state" in the case where the terminal has searched a suitable cell after a cell selection/reselection procedure.

In this state, a terminal monitors a paging channel to confirm whether there is new data from a network, and receives system information. Further, the terminal performs measurement for performing cell reselection and performs cell reselection procedure according to the conditions.

Cell selection when leaving RRC_connected state
State where a terminal attempts to search a suitable cell when the terminal is shifted from RRC_connected state to RRC_idle state Any cell selection state
State where a terminal attempts cell selection to find an acceptable cell of any enterpriser if the terminal is unable to find a suitable cell or refused by a selected enterpriser. Thereafter, if the acceptable cell is found, the terminal is shifted to a state where the terminal is camped on any cell.

Camped on any cell state
In this state, a terminal monitors a paging channel to confirm whether there is new data from a network, and receives system information. Further, the terminal performs measurement for performing cell reselection and performs cell reselection procedure according to the conditions. Further, the terminal periodically attempts to find whether a suitable cell is in the neighborhood.

On the other hand, a terminal in an idle state can grasp information of neighboring base stations through reception of system information from the base station, and in particular, the terminal is notified of a list of Physical Cell Identifiers (hereinafter called "PCIs") that CSG base stations use from System Information Block (hereinafter called "SIB") number 4. A parameter that is used to notify this is csg-PhysCellIdRange, and the terminal that has received this is valid for 24 hours in the case where the terminal is continuously camped on the cell of an enterpriser that has received this, and in this period, if the terminal is not a member of the CSG cell, cells that use the corresponding PCI are excluded from the target of cell selection/reselection.

Further, during the cell selection/reselection, the terminal may perform the cell selection/reselection procedure by setting priorities of cells that receive signals which are received from neighboring cells and of which the strength is equal to or higher than a predetermined level according to LTE versions in accordance with the intensity of the signals (e.g., LTE release 8 terminal), or may perform the cell selection/reselection procedure by setting priorities of cells that receive signals which are received from neighboring cells and of which the strength and the quality are equal to or higher than predetermined levels in accordance with the strength of the signals (e.g., LTE release 9 terminal). A method for setting priorities with respect to other frequencies having the same frequency and the same priority as the serving cell is performed using Equation 1 and Equation 2 below.

$$Rs = Q\text{meas},s + Q\text{Hyst} \quad \text{[Equation 1]}$$

$$Rn = Q\text{meas},n - Q\text{offset} \quad \text{[Equation 2]}$$

Here, Rs denotes a priority value of a serving cell, Qmeas,s denotes an average signal strength measurement value (RSRP) of the serving cell, and QHyst denotes a hysteresis value for setting the priority order of the serving cell.

Further, Rn denotes a priority value of a neighboring cell, Qmeas,s denotes an average signal strength measurement value (RSRP) of the neighboring cell, and Qoffset denotes an offset value for grading the neighboring cells. If the base station notifies of this offset value, the priority can be lowered by designating a separate offset value with respect to a specific cell and a specific frequency.

Further, according to a method for setting priorities with respect to a frequency having low priority and heterogeneous RAT (Inter-RAT) frequencies, in the case where the currently camping cell downloads a signal quality related parameter threshServingLowQ and the serving cell signal is Squal<ThreshServing,LowQ, the corresponding cell is selected if the signal quality of a neighboring cell is Squal>ThreshX,LowQ (in case of LTE or WCDMA) or if the signal strength of the neighboring cell is Srxlev>Thresh, Lowp (in case of GSM or CDMA2000). The above-described procedures are called general cell selection/reselection procedures.

FIG. 3 illustrates a cell reselection method to LTE adjacent frequency/adjacent UTRAN FDD frequency of a terminal in an RRC-idle mode in the 3GPP system. The terminal in the RRC-idle mode is in a state where RRC connection to the base station is not set, and selects a suitable cell according to the channel environment while periodically receiving a partial shared channel such as paging to secure mobility of the terminal. The detailed operation of the terminal in the idle mode in the 3GPP system is based on 'TS36.304 E-UTRA UE Procedures in idle mode' 3GPP standards. If the terminal in the LTE idle mode starts management for cell reselection to the adjacent LTE frequency or adjacent UTRAN FDD frequency (301), it is checked whether a signal quality related parameter value ThreshServingLowQ is provided through System Information Block (SIB) 3 that is one of system information being broadcast within the cell (311). The signal quality related parameter ThreshServiingLowQ is a comparison threshold value that is signalled through SIB 3 in order to determine the channel state Squal of the current serving cell as a condition for shifting to the LTE adjacent frequency having a lower priority than the current serving frequency or the frequency of another system. Squal will be described later. If the signal quality related parameter threshServingLowQ value is not signalled (i.e., not provided) through the SIB 3, the Srxlev value of the serving cell and the Srxlev value of the corresponding adjacent LTE frequency/UTRAN FDD frequency cell are derived (321) through application of the measured management result and the system information being broadcast from the serving LTE cell. Srxlev indicates a cell selection RX level value [dB], and is obtained by Equation 3 below. Qrxlevmeas denotes a downlink reception power that is a measurement value obtained by actually measuring a downlink RX channel through the terminal, Qrxlevmin denotes a required level of the minimum downlink reception power that is required to select the corresponding cell, Qrxlevminoffset denotes a threshold value that is added to Qrxlevmin only when the terminal that is in a Visited Public Land Mobile Network (VPLMN) periodically searches a Public Land Mobile Network (PLMN: communication enterpriser) having higher priority, and Pcompensation denotes a threshold value to consider the uplink channel state. Explanation of each parameter is as described in Table 1.

$$Srxlev = Qrxlevmeas - (Qrxlevmin + Qrxlevminoffset) - Pcompensation \quad \text{[Equation 3]}$$

TABLE 1

| | |
|---|---|
| Srxlev | Cell selection RX level value (dB) |
| Qrxlevmeas | Measured cell RX level value (RSRP) |
| Qrxlevmin | Minimum required RX level in the cell (dBm) |
| Qrxlevminoffset | Offset to the signalled Qrxlevmin taken into account in the Srxlev evaluation as a result of a periodic search for a higher priority PLMN while camped normally in a VPLMN |
| Pcompensation | max(PEMAX − PPowerClass, 0) (dB) |
| PEMAX | Maximum TX power level an UE may use when transmitting on the uplink in the cell (dBm) defined as PEMAX in [TS 36.101] |
| PPowerClass | Maximum RF output power of the UE (dBm) according to the UE power class as defined in [TS 36.101] |

Qrxlevmeas of the serving LTE cell and the adjacent LTE frequency cell is obtained as Reference Signal Received Power (RSRP), and Qrxlevmeas of the adjacent UTRAN frequency cell is obtained as Received Signal Code Power (RSCP). The detailed definition of the RSRP refers to "TS36.214 E-UTRA Physical Layer Measurements" standards of the 3GPP, and the detailed definition of the RSCP refers to "TS25.215 Physical Layer—Measurements (FDD)" of the 3GPP. Q-RxLevMin value that is received in System Information Block (SIB) 3 that is one of system information being broadcast from the serving LTE cell is applied as Qrxlevmin of the serving LTE cell, and Q-RxLevMin value that is mapped on the corresponding frequency that is received in SIB 5 that is one of system information being broadcast from the serving LTE cell is applied as Qrxlevmin of the adjacent LTE frequency cell. Further, Q-RxLevMin value that is mapped on the corresponding frequency that is received in SIB 6 that is one of system information being broadcast from the serving LTE cell is applied as Qrxlevmin of the adjacent UTRAN FDD frequency cell. That is, different Qrxlevmin values may be applied by frequencies when Srxlev of the serving LTE cell, Srxlev of the adjacent LTE frequency cell, and Srxlev of the adjacent UTRAN FDD frequency cell are obtained. PEMAX that is applied to obtain Pcompensation indicates the maximum allowable transmission power of the terminal that is set by the base station or Radio Network Controller (RNC), and in the same manner as Qrxlevmen, P-Max value that is received in SIB 3 is applied to the serving LTE cell, P-Max value that is received in SIB 5 is applied to the adjacent LTE frequency cell, and P-Max value that is received in SIB 6 is applied to the adjacent UTRAN FDD frequency cell. Ppowerclass indicates the actual maximum RF transmission power of the terminal. Different Ppowerclass values may be given by classes of the terminal.

The terminal checks whether the priority of the management-targeted adjacent LET frequency/UTRAN FDD frequency is higher than the priority of the serving LTE frequency (331). The priority information indicates which frequency the terminal should preferentially consider as the target of cell reselection, and may be received as a terminal dedicated message (e.g., RRC connection release message) when the system information being broadcast in the serving LTE cell or terminal is in an RRC connected state. If the priority of the management-targeted adjacent LET frequency/UTRAN FDD frequency is higher than the priority of the current serving LTE frequency (331), the Srxlev value of the adjacent LTE frequency/UTRAN FDD frequency cell is higher than the threshX,HighP value during a Treselection timer period (333), and one second elapses after movement to the current serving LTE cell (335), the cell reselection to the corresponding adjacent LTE frequency/UTRAN FDD frequency cell is performed (337). A Treselection timer value that is to be applied to the adjacent LTE frequency/UTRAN FDD frequency and ThreshX,HighP Srxlev comparison threshold value are received as system information being broadcast from the serving LTE cell. In contrast, if the priority of the management-targeted adjacent LET frequency/UTRAN FDD frequency is not higher than the priority of the current serving LTE frequency (i.e., is equal to or lower than the priority of the current serving LTE frequency) (331), the Srxlev value of the adjacent LTE frequency/UTRAN FDD frequency cell is higher than the threshX,LowP value during a Treselection timer period (333), the Srxlev value of the serving cell of the current LTE frequency is smaller than the ThreshServing,LowP value (341), and one second elapses after movement to the current serving LTE cell (335), the cell reselection to the corresponding adjacent LTE frequency/UTRAN FDD frequency cell is performed (337). If the above-described condition is not satisfied, the cell reselection to the adjacent LTE frequency/UTRAN FDD frequency is not performed. If the ThreshServingLowQ value is signalled/provided through SIB 3 of the serving LTE cell (311), Squal value of the serving cell and Squal value of the corresponding adjacent LTE frequency/UTRAN FDD frequency cell are derived through application of the measurement result of management and system information being broadcast from the serving LTE cell (351). Squal indicates a cell selection quality value (dB), and is obtained by Equation 4 below. Qqualmeas is a ratio of a received signal strength that is actually measured by the terminal through a downlink RS channel to the actually measured total noise, Qaualmin is the minimum level of the signal to noise ratio that is required to select the corresponding cell, and Qqualminoffset is a threshold value that is added to Qqualmin only when the terminal periodically searches a higher priority PLMN having high priority. Respective parameters are described in Table 2 below.

$$Squal = Qqualmeas - (Qrxlevmin - Qrxlevminoffset) \quad [\text{Equation 4}]$$

TABLE 2

| | |
|---|---|
| Squal | Cell selection quality value (dB) |
| Qqualmeas | Measured cell quality value (RSRQ) |
| Qqualmin | Minimum required quality level in the cell (dB) |
| Qqualminoffset | Offset to the signalled Qqualmin taken into account in the Squal evaluation as a result of a periodic search for a higher priority PLMN while camped normally in a VPLMN |

Qqualmeas of the serving LTE cell and the adjacent LTE frequency cell is obtained as Reference Signal Received Quality (RSRQ), and Qqualmeas of the adjacent UTRAN frequency cell is obtained as Ec/No (RSCP/Received Signal Strength Indicator (RSSI)). The detailed definition of the RSRQ refers to "TS36.214 E-UTRA Physical Layer Measurements" standards of the 3GPP, and the detailed definition of the Ec/No refers to "TS25.215 Physical Layer-Measurements (FDD)" standard of the 3GPP. Q-QualMin-r9 value that is received in SIB 3 that is one of system information being broadcast from the serving LTE cell is applied as Qqualmin of the serving LTE cell, and Q-QualMin-r9 value that is mapped on the corresponding frequency that is received in SIB 5 that is one of system information being broadcast from the serving LTE cell is applied as Qqualmin of the adjacent LTE frequency cell. Further, Q-qualMin value that is mapped on the corresponding frequency that is received in SIB 6 that is one of system information being broadcast from the serving LTE cell is applied as Qqualmin of the adjacent UTRAN FDD frequency cell. That is, different Qqualmin values may be applied by frequencies when Squal of the serving LTE cell, Squal of the adjacent LTE frequency cell, and Squal of the adjacent UTRAN FDD frequency cell are obtained.

The terminal checks whether the priority of the management-targeted adjacent LET frequency/UTRAN FDD frequency is higher than the priority of the serving LTE frequency (361). The priority information indicates which frequency the terminal should preferentially consider as the target of cell reselection, and may be received as a terminal dedicated message (e.g., RRC connection release message) when the system information being broadcast in the serving LTE cell or terminal is in an RRC connected state. If the priority of the management-targeted adjacent LET frequency/UTRAN FDD frequency is higher than the priority of the current serving LTE frequency (361), the Squal value of the adjacent LTE frequency/UTRAN FDD frequency cell is higher than the threshX,HighQ value during a Treselection timer period (363), and one second elapses after movement to the current serving LTE cell (365), the cell reselection to the corresponding adjacent LTE frequency/UTRAN FDD frequency cell is performed (367). A Treselection timer value that is to be applied to the adjacent LTE frequency/UTRAN FDD frequency and ThreshX,HighQ Squal comparison threshold value are received as system information being broadcast from the serving LTE cell. In contrast, if the priority of the management-targeted adjacent LET frequency/UTRAN FDD frequency is not higher than the priority of the current serving LTE frequency (i.e., is equal to or lower than the priority of the current serving LTE frequency) (361), the Squal value of the adjacent LTE frequency/UTRAN FDD frequency cell is higher than the threshX,LowQ value during a Treselection timer period, the Squal value of the serving cell of the current LTE frequency is smaller than the ThreshServing,LowQ value (371), and one second elapses after movement to the current serving LTE cell (365), the cell reselection to the corresponding adjacent LTE frequency/UTRAN FDD frequency cell is performed (367). If the above-described condition is not satisfied, the cell reselection to the adjacent LTE frequency/UTRAN FDD frequency is not performed.

Further, the terminal may search a Closed Subscriber Group (CSG) cell to which the terminal belongs during the general cell reselection procedure as described above, and if a CSG cell that is suitable to another frequency is found, the terminal performs cell reselection to the corresponding CGS cell regardless of the priority of the frequency on which the terminal is currently camped. That is, the CSG cell has the highest priority in the cell reselection.

On the other hand, in the case of a terminal that receives a Multimedia Broadcast and Multicast Service (MBMS) among terminals, the currently served frequency may be set to have the highest priority. Further, the terminals that intend to receive the MBMS service may set the highest priority with respect to the frequency at which the corresponding MBMS service is broadcast. The terminal, which is unable to receive any further service through the corresponding frequency or which has terminated the service, may not control the priority for the corresponding frequency at which the MBMS is served.

As described above, in a normal camped state, the terminal monitors a paging channel, and confirms whether there is data to be received by the terminal. However, if the paging channel is not properly received due to interference by other communication modules (e.g., Wi-Fi, Bluetooth, and GPS) in the terminal, the terminal may not receive a phone call that is made to the terminal, the mobility of the terminal may not be guaranteed, or an emergency message ETWS/CMAS may not be received.

Figure 5:
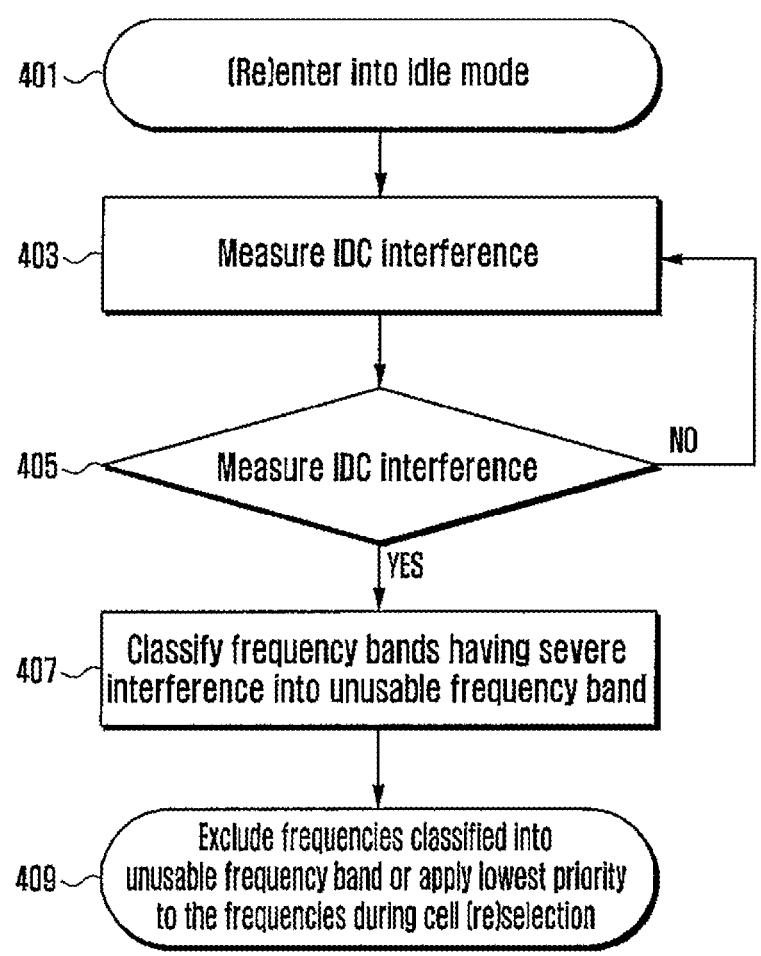
FIG. 5 is an exemplary flowchart illustrating the operation of a terminal in an idle mode proposed in the present disclosure.

FIG. 5 is an exemplary flowchart illustrating the operation of a terminal proposed by the present disclosure to solve the above-describe problem.

In FIG. 5, the terminal enters into an idle mode (401).

Thereafter, the terminal determines whether there is any interference due to the coexistence of heterogeneous communication modules in the terminal (403). The determination method may be classified into a direct determination method and an indirect determination method.

The direct determination method may be performed in the case where an internal communication is possible between the LTE communication module and the heterogeneous communication module. In this case, when the heterogeneous communication module operates or does not operate, it may notify the LTE communication module that the interference will start or not. For example, when a wireless LAN module starts transmission of wireless LAN data, it notifies the LTE module of this, and thus the LTE module can know that the interference with the wireless LAN module starts.

On the other hand, the indirect determination method may determine whether there is any interference by simultaneously measuring the signal strength and the signal quality when the LTE measures neighboring cells for mobility support or the like. For example, if the signal quality is abruptly deteriorated while the signal strength is kept at a similar level in a state where the signal strength and the signal quality of the terminal are good, the indirect determination method may determine that the interference with the heterogeneous has occurred. As another scheme, a determination method may be used in the case where fluctuation of the RSRP of the serving cell/adjacent cell occurs, or the RSRP of the serving cell/adjacent cell is not properly sensed in a state where the whole received signal strength indication value is large. As still another scheme, a determination method may be used in the case where the PDCCH channel reception error rate of the RA-RNTI is continuously kept high.

If it is determined that there is no interference due to In-Device Coexistence (IDC) using the above-described determination method, the above-described general cell selection/reselection procedure is performed.

According to embodiments, even if the interference occurs due to the IDC, which is determined by the above-described determination method, it may be determined whether the interference is severe (405), and if the interference is not severe as the result of the determination, the above-described general cell selection/reselection procedure may be performed.

According to the determination of whether the interference is severe at operation 405, it may be determined that the interference is severe in the case where the measured signal strength or signal quality becomes lower than a preset threshold value due to the interference.

However, if it is determined that the interference with the IDC exists using the above-described determination method, the corresponding frequency may be classified into an affected frequency or unusable frequency (407), and the frequency (or frequencies) classified into the affected frequency may be excluded from the cell selection/reselection procedure, or a low priority may be applied to the corresponding frequency (409).

Further, according to embodiments, if it is determined that the interference with the IDC exists using the above-described determination method, it may be determined whether the interference is severe (405), the corresponding frequency may be classified into an affected frequency or unusable frequency (407) only in the case where the interference is severe, and the frequency classified into the affected frequency may be excluded from the cell selection/reselection procedure, or a low priority may be applied to the corresponding frequency (409).

In this case, if a Closed Subscriber Group (CSG) cell to which the terminal belongs exists at the corresponding frequency, according to the general cell selection/reselection procedure, the highest priority should be set with respect to the corresponding frequency in so far as the terminal is camped on the corresponding CSG cell. However, according to the present disclosure, if the interference with the IDC starts, the lowest priority is set with respect to the corresponding frequency, and the terminal avoids to be camped on the corresponding frequency even if there is a CSG cell to which the terminal belongs.

Further, if a terminal receives an MBMS and the corresponding frequency is an MBMS frequency, according to the general cell selection/reselection procedure, the highest priority should be set with respect to the corresponding frequency in so far as the terminal is camped on the frequency at which the MBMS is served. However, according to the present disclosure, if the interference with the IDC starts, the lowest priority is set with respect to the corresponding frequency, and the terminal avoids to be camped on the frequency at which the MBMS is served to avoid the interference.

In the case where the terminal unavoidably stays at the current frequency due to the fact that there is no other adjacent available frequency except for the frequency with which the terminal is under Industrial, Scientific and Medical (ISM) interference although the priority is lowered, the terminal may make ISM denial of transmission and reception of the interfered communication module while being camped on the corresponding frequency until the terminal receives a scheme to avoid the interference from a network. For example, the terminal may operate to correctly receive a Primary Synchronization signal (PSS)/Secondary Synchronization Signal (SSS), a Physical Broadcast Channel (PBCH), a System Information Block (SIB) 1, and a paging message in the timing of $0^{th}$, $4^{th}$ $5^{th}$ and $9^{th}$ sub-frames in which sub-frames required to receive the paging message at the frequency where the interference occurs or sub-frames for performing random access due to the occurrence of data to be sent by the terminal, that is, the PSS/SSS, PBCH, SIB 1, and paging message, can be transmitted. The explanation and transmission position of the PSS/SSS, PBCH, SIB 1, and paging message are as follows.

Primary Synchronization Signal (PSS) and Secondary Synchronization Signal (SSS): that are signals used for cell synchronization, and may be transmitted at $0^{th}$ and $5^{th}$ sub-frames.

Physical Broadcast Channel (PBCH): that is a channel for transmitting master information block. That may notify the terminal of a downlink bandwidth and basic setting, and may be transmitted at $0^{th}$ sub-frame.

SIB 1: that may include ID related to cell connection and scheduling information of other SIBs, and may be transmitted at $5^{th}$ sub-frame.

Paging message: that may be used to notify the terminal that there is downlink data or to notify the terminal of system information change and PWS message, and may be transmitted at $9^{th}$ sub-frame, at $4^{th}$ and $9^{th}$ sub-frames, or at $0^{th}$, $4^{th}$, $5^{th}$, and $9^{th}$ sub-frames.

In this case, whether the paging message is transmitted at $9^{th}$ sub-frame, at $4^{th}$ and $9^{th}$ sub-frames, or at $0^{th}$, $4^{th}$, $5^{th}$ and $9^{th}$ sub-frames may be calculated using parameters commonly set to transfer the paging message in the system, a DRX period set for a specific terminal, and terminal ID (UE_ID).

On the other hand, the LTE system provides a support of a Public Warning System (PWS) using a system information (SIB) broadcasting method.

In the LTE, briefly two PWSs are used as follows.

Earthquake and Tsunami Warning System (ETWS)
  This is a PWS developed to satisfy the required conditions to notify a terminal of earthquake or tsunami when the earthquake or tsunami is generated.
  This may include a primary notification for transferring event notification within 4 seconds and a secondary notification for providing detailed information.
  In the LTE system, the primary notification and the secondary notification may be transferred using SIB 10 and SIB 11.

Commercial Mobile Alert System (CMAS)
  This is a PWS developed to transfer a plurality of alert notifications that are simultaneously generated.
  The CMAS notification may include a short text message.
  In the LTE system, the MCAS notification may be transferred using SIB 12.

Figure 6:
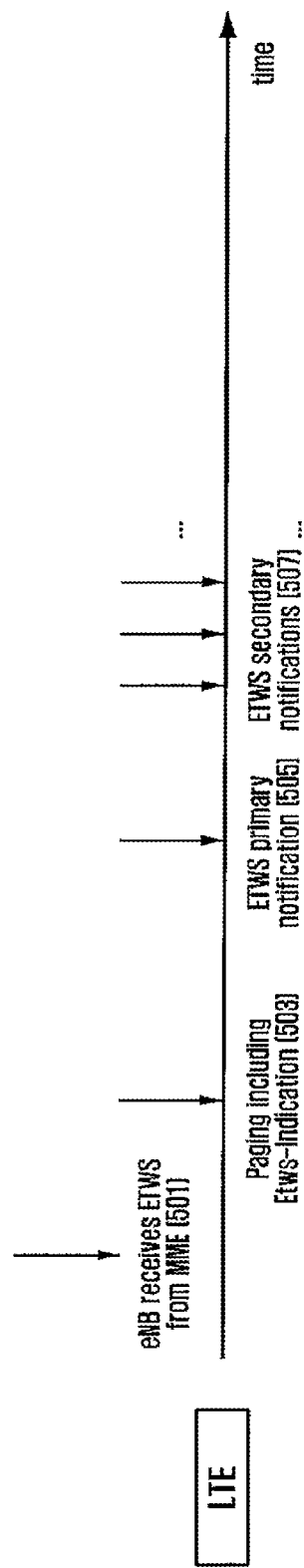
FIG. 6 is an exemplary diagram illustrating a process of transmitting an ETWS message in an LTE system.

FIG. 6 is an exemplary diagram illustrating a process of transmitting an ETWS message in an LTE system.

Referring to FIG. 6, if an ETWS message is generated due to generation of earthquake or tsunami, the ETWS message is transferred to a base station through MME (501).

The base station that has received this may transmit a paging message to terminals in a cell, and may set ETWS indication, which is indicated by the ETWS message to be transmitted in the paging message, to TRUE to transmit the ETWS indication.

Thereafter, the base station may transmit the ETWS primary notification through SIB 10 (505), and may transmit the TEWS secondary notification that may include more detailed contents using SIB 11 (507).

The above-described ETWS message may be an important message that may affect a matter of life and death of a terminal user. If the terminal is unable to properly receive this, a user's life may be severely threatened.

In order to receive the paging message, SIB 10 message, and SIB 11 message, it is required for the terminal to receive the following signal/message.

Primary Synchronization Signal (PSS) and Secondary Synchronization Signal (SSS): that are signals used for cell synchronization, and may be transmitted at $0^{th}$ and $5^{th}$ sub-frames.

Physical Broadcast Channel (PBCH): that is a channel for transmitting master information block. That may notify the terminal of a downlink bandwidth and basic setting, and may be transmitted at $0^{th}$ sub-frame.

SIB 1: that may include ID related to cell connection and scheduling information of other SIBs, and may be transmitted at $5^{th}$ sub-frame.

Paging message: that may be used to notify the terminal that there is downlink data or to notify the terminal of system information change and PWS message, and may be transmitted at $9^{th}$ sub-frame, at $4^{th}$ and $9^{th}$ sub-frames, or at $0^{th}$, $4^{th}$, $5^{th}$, and $9^{th}$ sub-frames.

In this case, whether the paging message is transmitted at $9^{th}$ sub-frame, at $4^{th}$ and $9^{th}$ sub-frames, or at $0^{th}$, $4^{th}$, $5^{th}$, and $9^{th}$ sub-frames may be calculated using parameters commonly set to transfer the paging message in the system, a DRX period set for a specific terminal, and terminal ID (UE_ID).

SIB 10/11/12: They are system blocks to transmit a PWS (ETWS or CMAS) message, and may be transmitted according to scheduling information from SIB 1.

Figure 7:
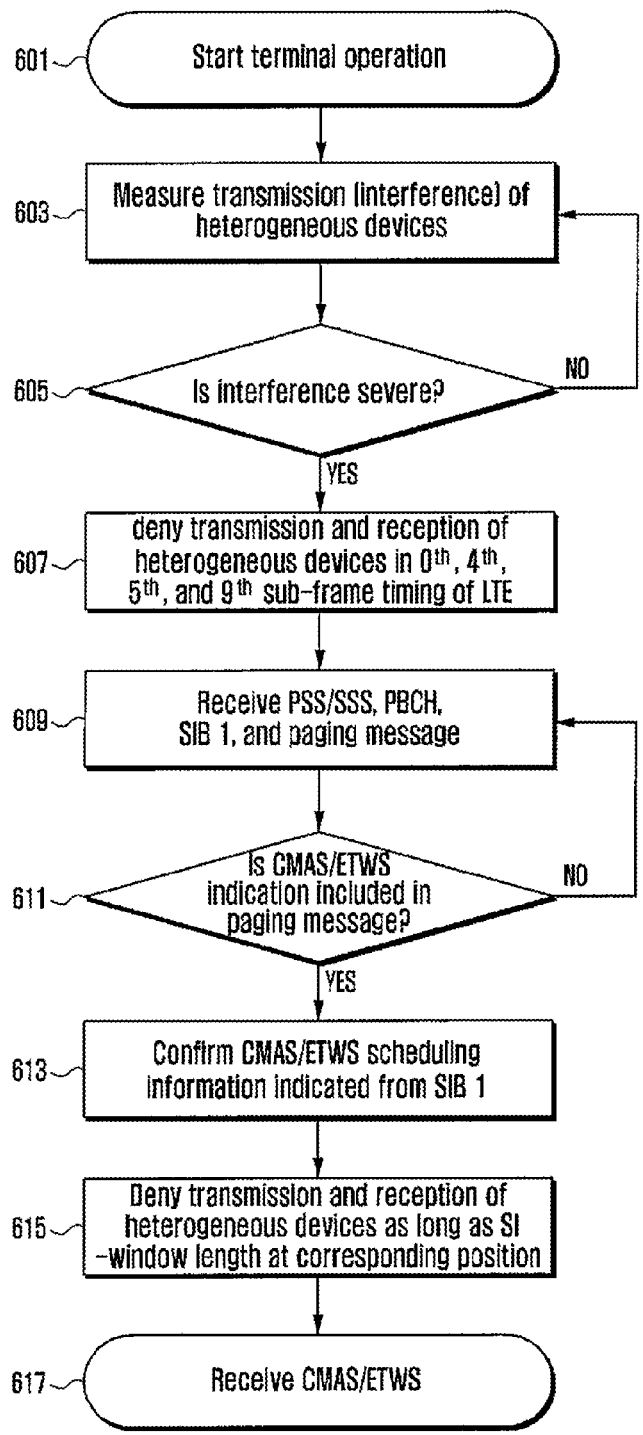
FIG. 7 is a first exemplary flowchart illustrating the operation of a terminal for receiving a PWS message proposed in the present disclosure.

FIG. 7 is a first exemplary flowchart illustrating the operation of a terminal for receiving a PWS message proposed in the present disclosure.

As the operation of a terminal starts (601), it is measured whether there is any interference with a heterogeneous device (603). As described above with reference to FIG. 5, the measurement method may be classified into a direct method and an indirect method.

The direct method may be performed in the case where an internal communication is possible between the LTE communication module and the heterogeneous communication module. In this case, when the heterogeneous communication module operates or does not operate, it may notify the LTE communication module that the interference will start or not. For example, when a wireless LAN module starts transmission of wireless LAN data, it notifies the LTE module of this, and thus the LTE module can know that the interference with the wireless LAN module starts.

On the other hand, the indirect method may determine whether there is any interference by simultaneously measuring the signal strength and the signal quality when the LTE measures neighboring cells for mobility support or the like. As another scheme, a determination method may be used in the case where fluctuation of the RSRP of the serving cell/adjacent cell occurs, or the RSRP of the serving cell/adjacent cell is not properly sensed in a state where the whole received signal strength indication value is large. As still another scheme, a determination method may be used in the case where the PDCCH channel reception error rate of the RA-RNTI is continuously kept high.

If it is determined that the interference is severe (605), the transmission and reception of the interfered communication module may be denied (ISM denied) in the sub-frame that is necessary to receive the paging message (607). That is, by denying the transmission and reception of the interfered communication module in the timing of $0^{th}$, $4^{th}$, $5^{th}$, and $9^{th}$ sub-frames in which the above-described PSS/SSS, PBCH, SIB 1, and paging message can be transmitted, the PSS/SSS, PBCH, SIB 1, and paging message can be correctly received (609).

According to embodiments, it may be determined that the interference is severe (605) in the case where the measured signal strength or the signal quality becomes lower than a preset threshold value due to the interference.

It is determined whether ETWS/CMAS indication is included in the received paging message (611), and if the ETWS indication is included, SIB 1 confirms the scheduling information of SIB 10 and SIB 11, while if the CMAS indication is included, SIB 1 confirms the scheduling information of SIB 12 (613).

Accordingly, in a time period when transmission of ETWS or CMAS is scheduled, the transmission and reception of the interfered communication module is denied (ISM denied) (615), and thus the corresponding ETWS or CMAS message can be received without the interference in the above-described time period (617). The above-described time period is set by a parameter that is called si-WindowLength, and the base station set the time period through SIB 1.

More specifically, the system block transmission after SIB 2 except for MIB and SIB 1 is performed in a manner that information on how the transmission is scheduled is transmitted through SIB 1, and the terminal that has received SIB 1 receives the scheduling information after SIB 2 to receive the corresponding SIB.

The scheduling information includes the si-WindowLength parameter and periodic information on the respective SIBs, and each SIB is transmitted through dynamic allocation of resources in the sub-frame for a length that is designated by the si-WindowLength parameter value. Further, the time when all the SIBs are transmitted after SIB 2 has the same length set to the si-WindowLength (SI-window), only the corresponding SIB is transmitted in one SI-window, and the time does not overlap the transmission time of other SIBs.

Figure 8:
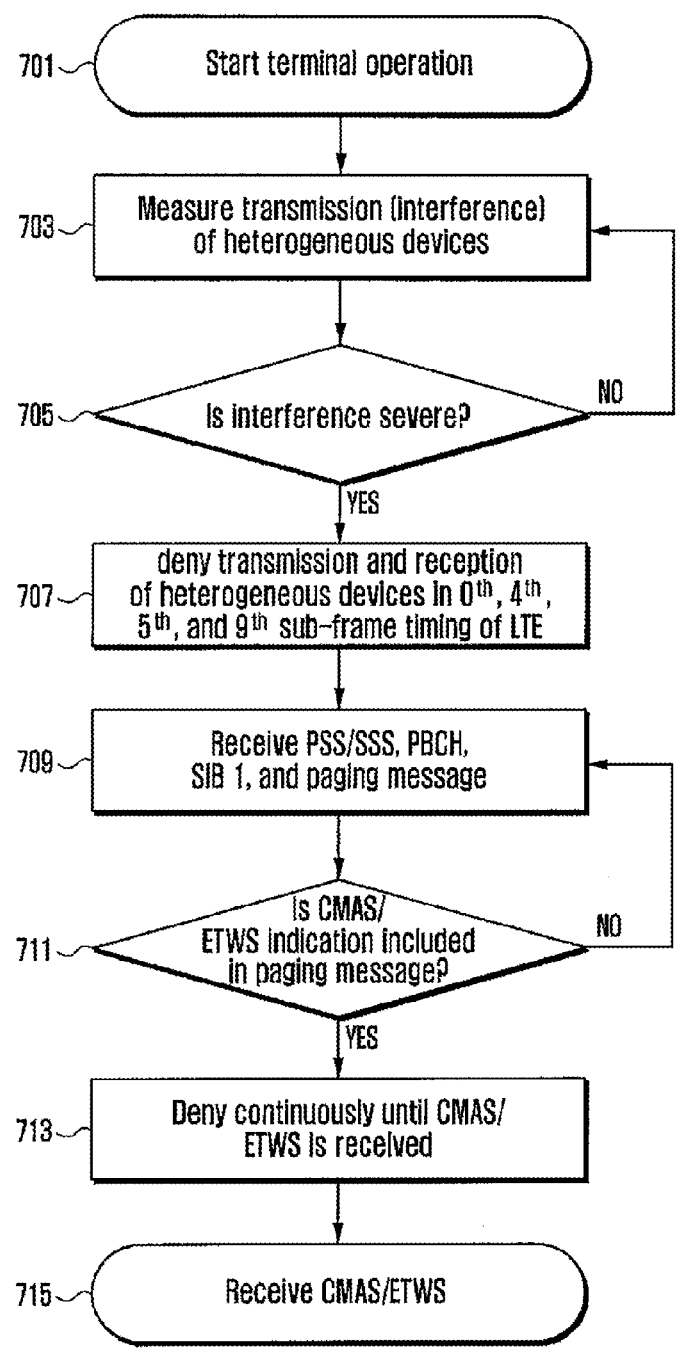
FIG. 8 is a second exemplary flowchart illustrating the operation of a terminal for receiving a PWS message proposed in the present disclosure.

FIG. 8 is a second exemplary flowchart illustrating the operation of a terminal for receiving a PWS message proposed in the present disclosure.

As the operation of a terminal starts (701), it is measured whether there is any interference with a heterogeneous device (703). As described above with reference to FIG. 5, the measurement method may be classified into a direct method and an indirect method.

The direct method may be performed in the case where an internal communication is possible between the LTE communication module and the heterogeneous communication module. In this case, when the heterogeneous communication module operates or does not operate, it may notify the LTE communication module that the interference will start or not. For example, when a wireless LAN module starts transmission of wireless LAN data, it notifies the LTE module of this, and thus the LTE module can know that the interference with the wireless LAN module starts.

The indirect method may determine whether there is any interference by simultaneously measuring the signal strength and the signal quality when the LTE measures neighboring cells for mobility support or the like.

If it is determined that the interference is severe (705), the transmission and reception of the interfered communication module may be denied (ISM denied) in the sub-frame that is necessary to receive the paging message (707). That is, by denying the transmission and reception of the interfered communication module in the timing of $0^{th}$, $4^{th}$, $5^{th}$ and $9^{th}$ sub-frames in which the above-described PSS/SSS, PBCH, SIB 1, and paging message can be transmitted, the PSS/SSS, PBCH, SIB 1, and paging message can be correctly received (709).

According to embodiments, it may be determined that the interference is severe (705) in the case where the measured signal strength or the signal quality becomes lower than a preset threshold value due to the interference.

It is determined whether ETWS/CMAS indication is included in the received paging message (711), and if the ETWS indication or CMAS indication is included, the corresponding ETWS or CMAS message can be received (715) by denying (ISM denying) the transmission and reception of the interfered communication module (713) until the ETWS indication or CMAS indication is received. This is because the ETWS indication or CMAS indication can be transmitted at any time in addition to the above-described scheduled time.

Figure 9:
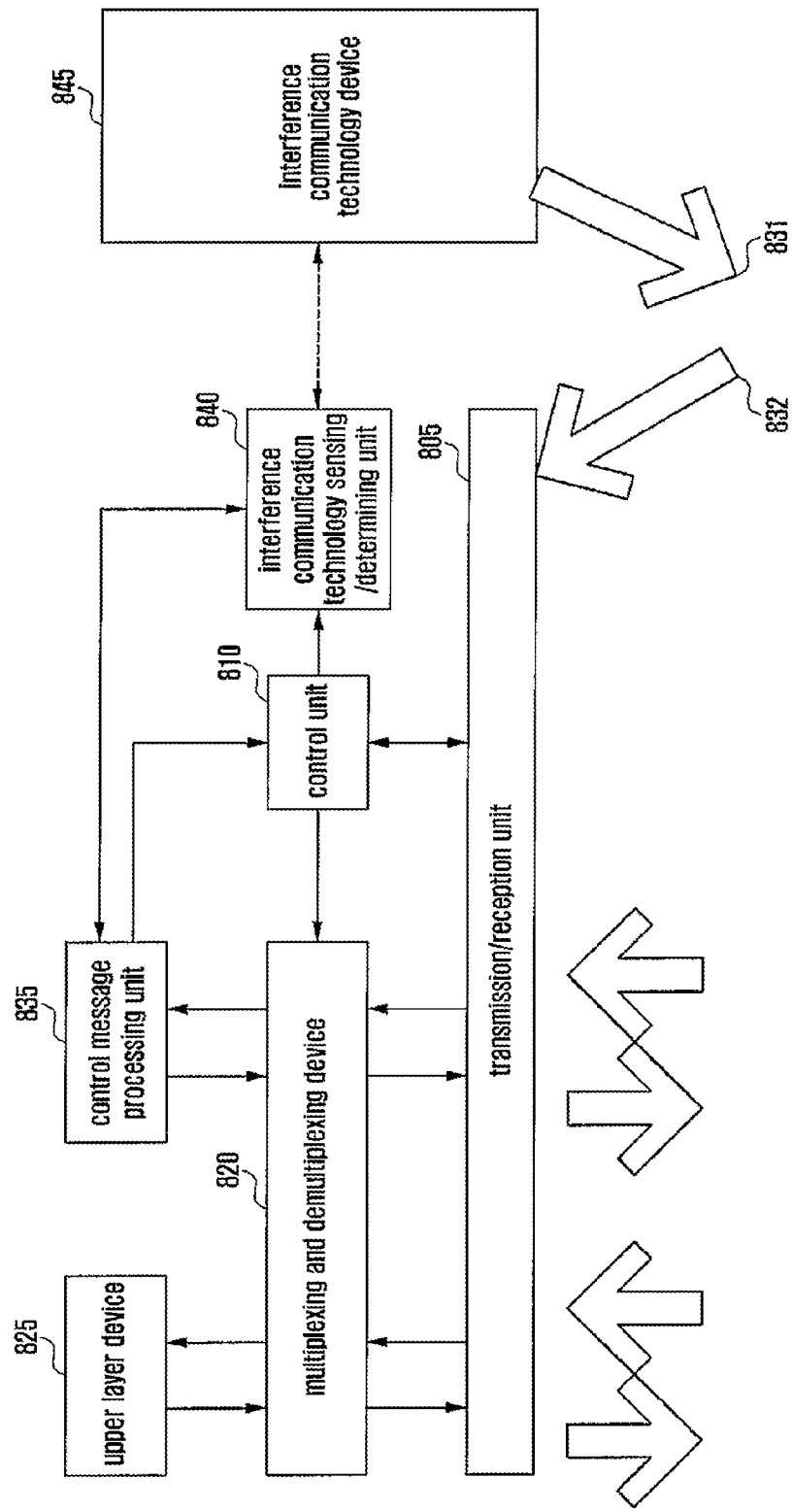
FIG. 9 is a block diagram illustrating the configuration of a terminal according to an embodiment of the present disclosure.

FIG. 9 is a block diagram illustrating the configuration of a terminal according to an embodiment of the present disclosure.

Referring to FIG. 9, a terminal according to an embodiment of the present disclosure includes a transmission/reception unit 805, a control unit 810, a multiplexing and demultiplexing unit 820, a control message processing unit 835, and various kinds of upper layer processing units 825.

The transmission/reception unit 805 receives data and specific control signals through a forward channel of a serving cell, and transmits the data and specific control signals through a backward channel. If a plurality of serving cells are set, the transmission/reception unit 805 performs transmission and reception of the data and control signals through the plurality of serving cells.

The multiplexing and demultiplexing unit 820 multiplexes the data generated by the upper layer processing unit 825 or the control message processing unit 835 or demultiplexes the data received through the transmission/reception unit 805 to transfer the multiplexed or demultiplexed data to the upper layer processing unit 825 or the control message processing unit 835.

The control message processing unit 835 processes control messages that are received from a base station to take necessary actions. For example, the control message processing unit 835 receives parameters related to DRX and transfers the received parameters to the control unit 810.

The upper layer processing unit 825 may be configured by services. The upper layer processing unit 825 processes data that is generated in a user service, such as File Transfer Protocol (FTP) or Voice over Internet Protocol (VoIP), to transfer the processed data to the multiplexing and demultiplexing unit 820, or processes data that is transferred from the multiplexing and demultiplexing unit 820 to transfer the processed data to service applications of an upper layer.

The control unit 810 confirms scheduling commands, for example, backward grants, which are received through the transmission/reception unit 805, and controls the transmission/reception unit 805 and the multiplexing and demultiplexing unit 820 to perform backward transmission with proper transmission resources at a proper time. The control unit 810 also controls the transmission/reception unit in relation to the DRX operation and CSI/SRS transmission.

In the present disclosure, it is assumed that an interference communication technology device 845, such as Wi-Fi, Bluetooth, or GPS, is shared in a terminal device. In the case of using the direct interference notification method proposed in the present disclosure, an interference communication technology sensing/determining unit 840 and the interference communication technology device 845 may notify each other of existence/nonexistence of the interference. Further, in the case of using the indirect method based on the signal strength that comes through the transmission/reception unit 805, the interference communication technology sensing/determining unit 840 may determine the existence/nonexistence of the interference through measurement of the signal and the interference.

Using the proposed method, the terminal can maximally avoid the interference in the idle mode to operate without malfunction, and can correctly receive a message of a public warning system regardless of the operation mode, so that the user can timely receive the corresponding message.

Although the preferred embodiments have been described in detail, various modifications can be made within the limit that does not secede from the scope of the present disclosure. Accordingly, the scope of the present disclosure is not limited to the above-described embodiments, but should be construed as including all other replacements, modifications, and changes which fall within the scope of the claims.

The invention claimed is:

1. A method of controlling an idle mode of a terminal in a wireless communication system, comprising:
   determining whether interference occurs between a first transceiver for cellular network and a second transceiver for ISM (industrial, scientific and medical) network that are heterogeneous communication modules of the terminal; and
   limiting, if the interference occurs between the heterogeneous communication modules, camping on a corresponding frequency of the communication module in which the interference occurs;
   limiting transmission and reception of the second transceiver in a sub-frame required to receive a paging message by the first transceiver;
   receiving the paging message after the limiting of camping;
   determining whether earthquake and tsunami warning system (ETWS) or commercial mobile alert system (CMAS) indication is included in the received paging message;
   confirming, if the indication is included in the paging message, scheduling information; and
   limiting transmission and reception of the communication module in which the interference occurs based on the scheduling information.

2. The method of claim 1, wherein the limiting of camping comprises excluding the corresponding frequency of the communication module in which the interference occurs from a cell selection procedure.

3. The method of claim 1, wherein the limiting of camping comprises setting a priority of the corresponding frequency of the communication module in which the interference occurs to a low value.

4. The method of claim 1, wherein the determining of whether the interference occurs comprises:
   determining whether the currently operating communication module and the heterogeneous communication module operate; and
   transmitting whether the heterogeneous communication module operates to the currently operating communication module.

5. The method of claim 1, further comprising:
   measuring at least one of a signal strength and a signal quality of a neighboring cell;
   determining, if the interference occurs between the heterogeneous communication modules, whether the measured signal strength or signal quality becomes lower than a preset threshold value due to the interference; and
   limiting, if the measured signal strength or signal quality becomes lower than the preset threshold value as the result of the determination, camping on the corresponding frequency of the communication module in which the interference occurs.

6. A terminal controlling an idle mode in a wireless communication system, comprising:
   a first transceiver configured to transmit and receive a signal via a cellular network;
   a second transceiver configured to transmit and receive a signal via ISM (industrial, scientific and medical) network;

a controller configured to:
- determine whether interference occurs between the first transceiver and the second transceiver that are heterogeneous communication modules of the terminal,
- limit, if the interference occurs between the heterogeneous communication modules, camping on a corresponding frequency of the communication module in which the interference occurs,
- limit transmission and reception of the second transceiver in a sub-frame required to receive a paging message by the first transceiver,
- receive the paging message after the limiting of camping,
- determine whether earthquake and tsunami warning system (ETWS) or commercial mobile alert system (CMAS) indication is included in the received paging message,
- confirm, if the indication is included in the paging message, scheduling information, and
- limit transmission and reception of the communication module in which the interference occurs based on the scheduling information.

7. The terminal of claim 6, wherein the controller is further configured to exclude the corresponding frequency of the communication module in which the interference occurs from a cell selection procedure.

8. The terminal of claim 6, wherein the controller is further configured to set a priority of the corresponding frequency of the communication module in which the interference occurs to a low value.

9. The terminal of claim 6, wherein the controller is further configured to:
- determine whether the currently operating communication module and the heterogeneous communication module operate, and
- transmit whether the heterogeneous communication module operates to the currently operating communication module.

10. The terminal of claim 6, wherein the controller is further configured to:
- measure at least one of a signal strength and a signal quality of a neighboring cell,
- determine, if the interference occurs between the heterogeneous communication modules, whether the measured signal strength or signal quality becomes lower than a preset threshold value due to the interference, and
- limit, if the measured signal strength or signal quality becomes lower than the preset threshold value as the result of the determination, camping on the corresponding frequency of the communication module in which the interference occurs.

* * * * *